(12) United States Patent
Bordin et al.

(10) Patent No.: US 11,633,882 B2
(45) Date of Patent: Apr. 25, 2023

(54) METHOD FOR THE PRODUCTION OF PLASTIC FOOTWEAR

(71) Applicant: STEMMA SRL, Cornuda (IT)

(72) Inventors: Ettore Bordin, Montebelluna (IT); Stefano Pellizzari, Montebelluna (IT)

(73) Assignee: STEMMA SRL, Cornuda (IT)

(*) Notice: Subject to any disclaimer, the term of this patent is extended or adjusted under 35 U.S.C. 154(b) by 878 days.

(21) Appl. No.: 16/484,893

(22) PCT Filed: Feb. 16, 2018

(86) PCT No.: PCT/IB2018/050954
§ 371 (c)(1),
(2) Date: Aug. 9, 2019

(87) PCT Pub. No.: WO2018/150364
PCT Pub. Date: Aug. 23, 2018

(65) Prior Publication Data
US 2020/0406511 A1     Dec. 31, 2020

(30) Foreign Application Priority Data
Feb. 17, 2017   (IT) .................. 102017000017793

(51) Int. Cl.
| B29C 41/08 | (2006.01) |
| A43B 1/10 | (2006.01) |
| A43B 3/02 | (2006.01) |
| A43B 23/02 | (2006.01) |
| B29C 41/20 | (2006.01) |
| B29C 41/38 | (2006.01) |
| B29C 43/18 | (2006.01) |

(Continued)

(52) U.S. Cl.
CPC ............ B29C 41/08 (2013.01); A43B 1/10 (2013.01); A43B 3/02 (2013.01); A43B 23/026 (2013.01);
(Continued)

(58) Field of Classification Search
None
See application file for complete search history.

(56) References Cited

U.S. PATENT DOCUMENTS 3,769,392 A * 10/1973 Tessaro ............... A43B 5/0405
36/117.6
4,276,254 A      6/1981 Combronde
(Continued)

FOREIGN PATENT DOCUMENTS

DE      2943692 A1 *  5/1981
EP      1356919 A1    10/2003
(Continued)

OTHER PUBLICATIONS

Machine English translation of FR2435219, Accessed Jun. 8, 2022 (Year: 1980).*
(Continued)

*Primary Examiner* — Jacob T Minskey
*Assistant Examiner* — Adrianna N Konves
(74) *Attorney, Agent, or Firm* — Fredrikson & Byron, P.A.

(57) ABSTRACT

The present invention relates to a method for the production of plastic footwear (10; 100) of the "full plastic" type by means of moulding using a polyurethane mixture (M; P). The method comprises the steps of: —providing a mould (20) having a mould cavity (22) defined by at least two impressions (28, 30) and designed to receive a shoe last (24) so as to define, when the mould (20) is closed, an interspace (26) having the shape and dimensions of the plastic footwear (10; 100) to be produced; —spraying a polyurethane mixture (M, P) onto said at least two impressions (28, 30) of the mould cavity (22); —inserting the shoe last (24) inside said mould cavity (22); —closing the mould cavity (22) so that the sprayed polyurethane mixture (M, P) occupies said interspace (26); —opening the mould (20), once at least the demoulding time (td) for the sprayed polyurethane mixture (M, P) has lapsed, such that the sprayed polyurethane mixture (M, P) has solidified inside the interspace (26)

(Continued)

forming said plastic footwear (10, 100); —extracting the shoe last (24) from the mould cavity (22); —removing the plastic footwear (10, 100) from the shoe last (24).

20 Claims, 14 Drawing Sheets

(51) Int. Cl.
    *B29D 35/00*     (2010.01)
    *B29D 35/04*     (2010.01)
    *B29K 75/00*     (2006.01)

(52) U.S. Cl.
    CPC .............. *B29C 41/20* (2013.01); *B29C 41/38* (2013.01); *B29C 43/184* (2013.01); *B29D 35/0027* (2013.01); *B29D 35/0036* (2013.01); *B29D 35/04* (2013.01); *B29K 2075/00* (2013.01)

(56) References Cited

U.S. PATENT DOCUMENTS

| | | | |
|---|---|---|---|
| 2006/0134398 A1* | 6/2006 | Nakamura | B29C 44/0461 264/51 |
| 2010/0112217 A1* | 5/2010 | Pawlik | B05B 7/0475 427/255.28 |
| 2011/0200758 A1* | 8/2011 | Bordin | B29B 7/42 239/337 |
| 2013/0133229 A1* | 5/2013 | Ludemann | A43B 7/12 12/146 B |
| 2016/0031164 A1 | 2/2016 | Downs | |

FOREIGN PATENT DOCUMENTS

| | | | |
|---|---|---|---|
| EP | 2346614 A1 | | 7/2011 |
| FR | 2435219 | * | 4/1980 |
| JP | S6311101 A | | 1/1988 |
| JP | 2003334870 A | | 11/2003 |
| WO | 2010044046 A1 | | 4/2010 |
| WO | 2015132751 A2 | | 9/2015 |

OTHER PUBLICATIONS

Machine English translation of DE2943692A1, Accessed Jun. 8, 2022 (Year: 1981).*

PCT International Search Report and Written Opinion dated May 14, 2018 for Intl. App. No. PCT/IB2018/050954, from which the instant application is based, 10 pgs.

* cited by examiner

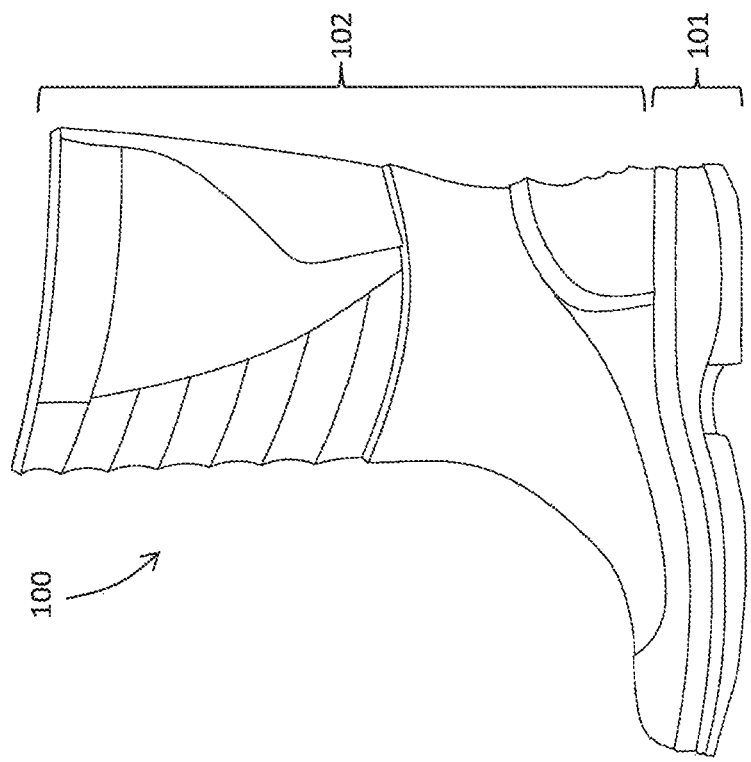
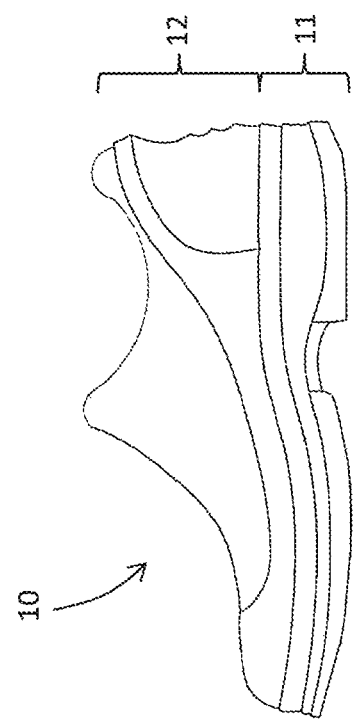

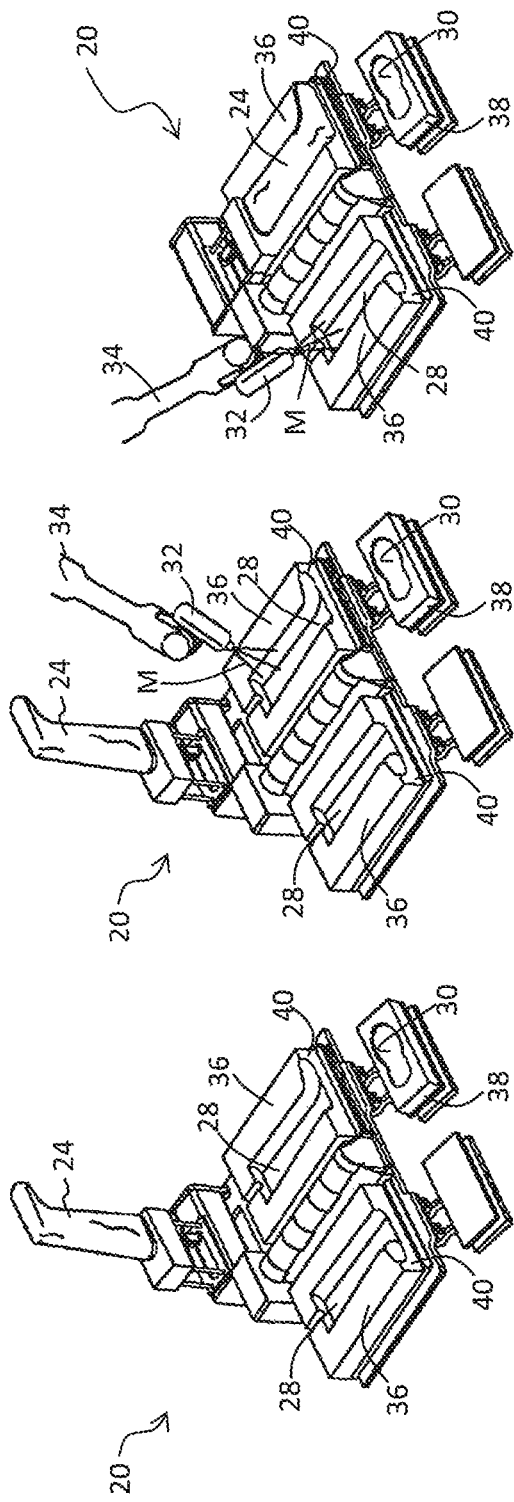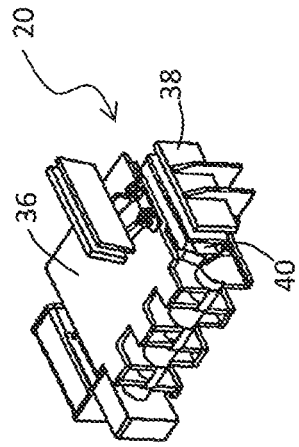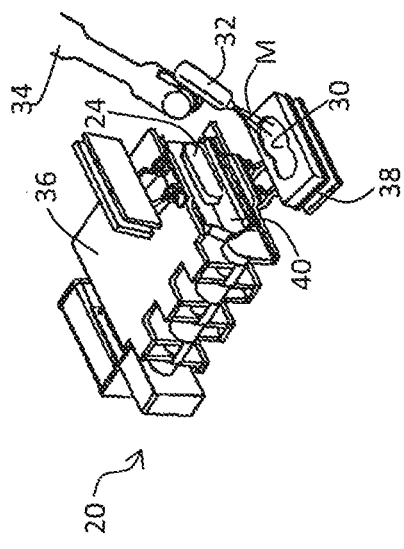

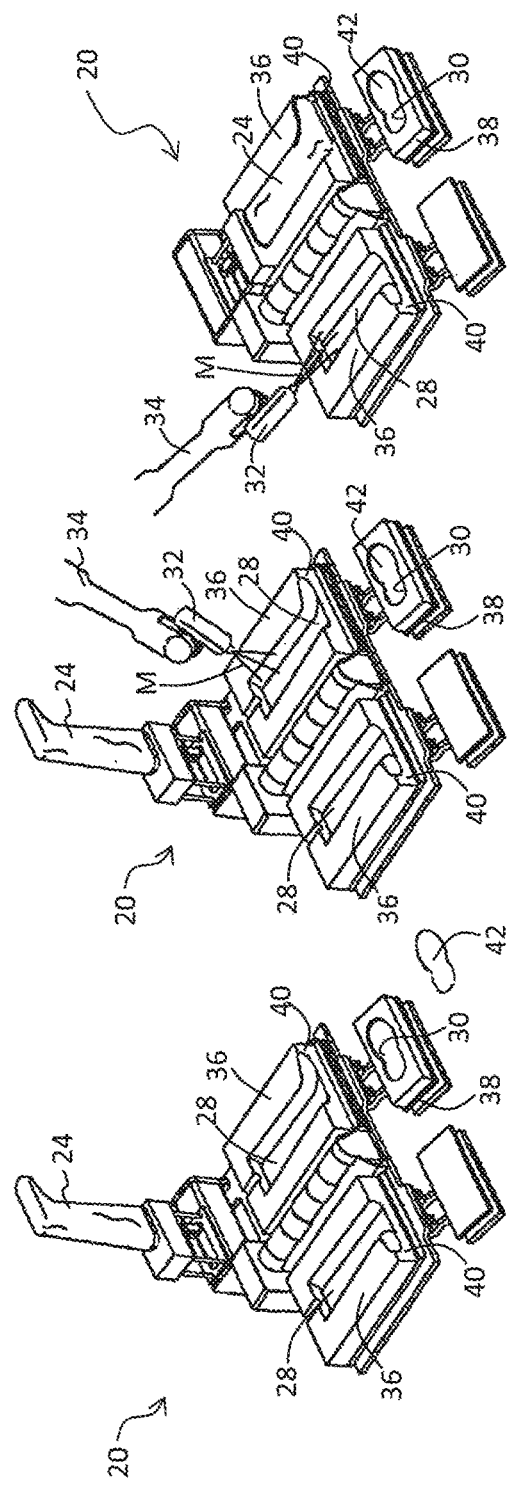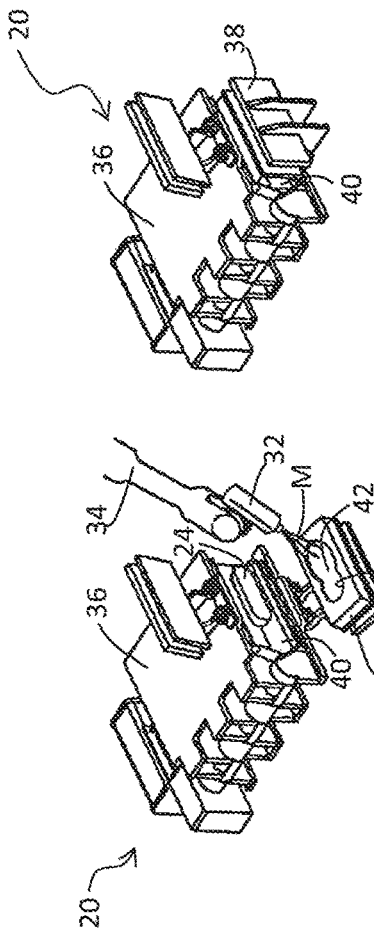

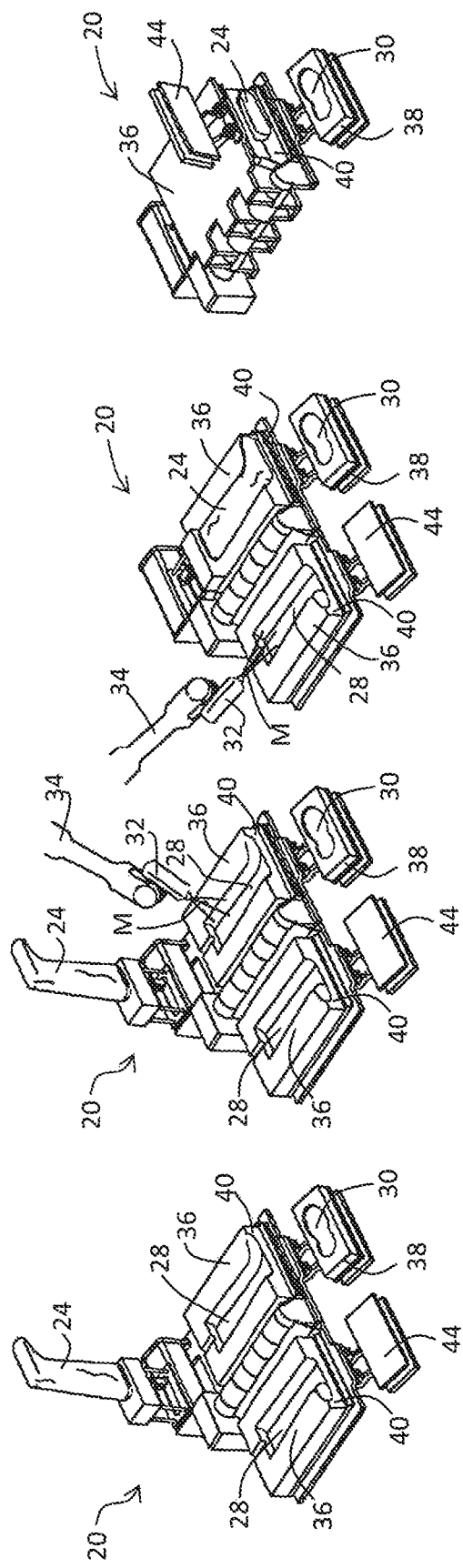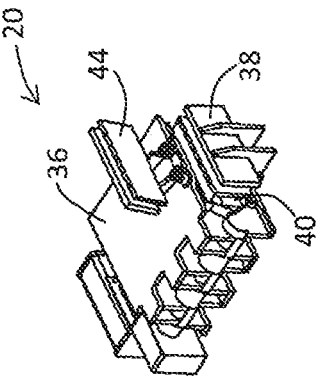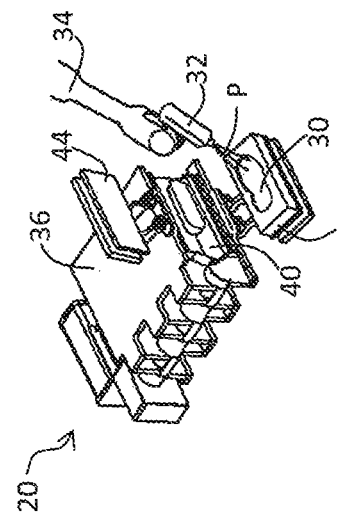

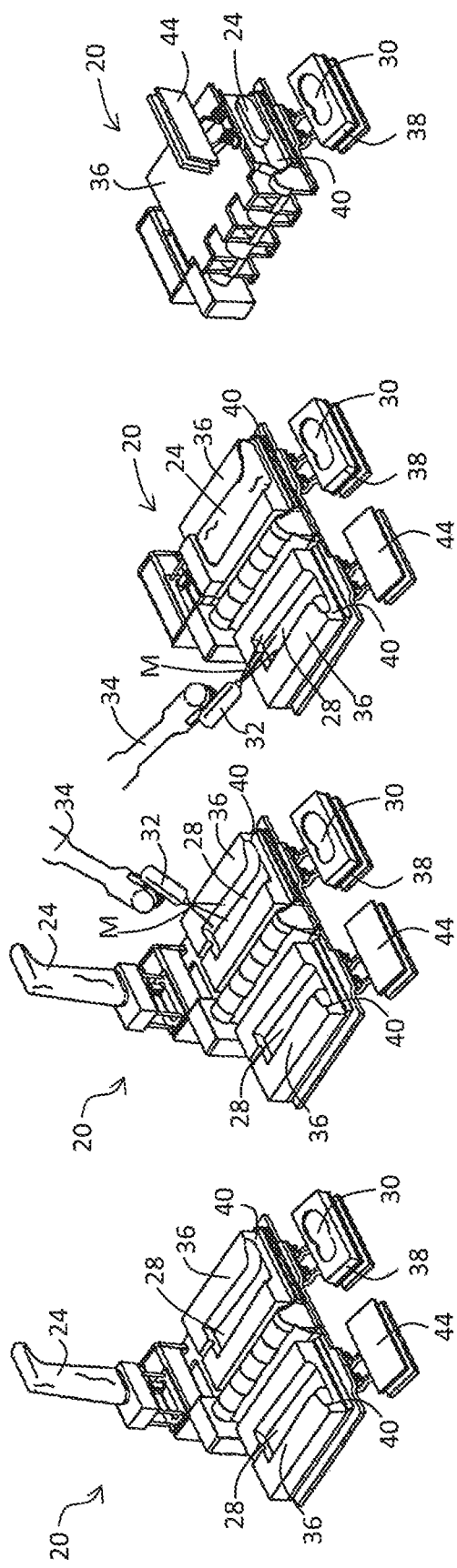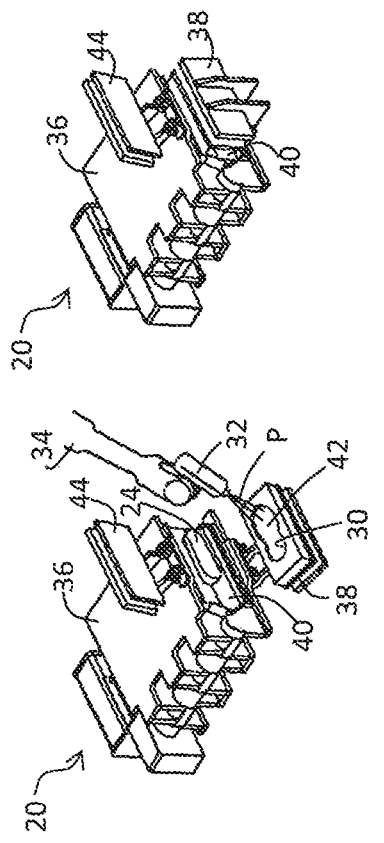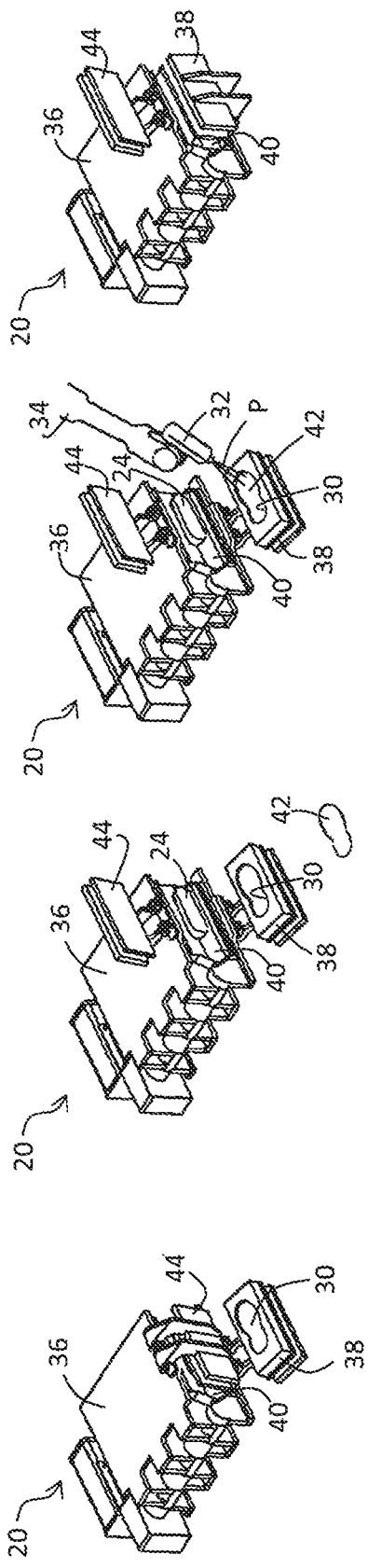

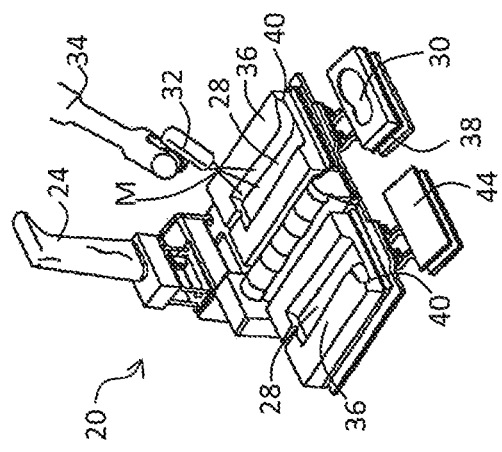
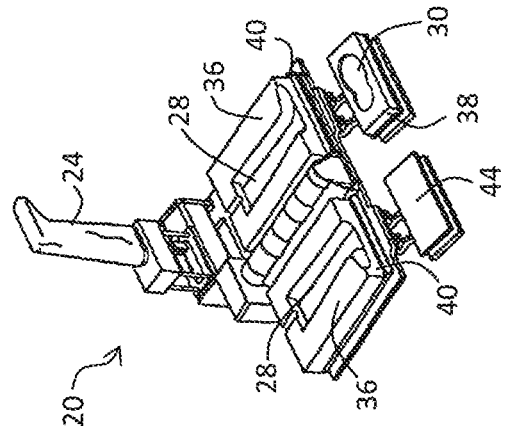
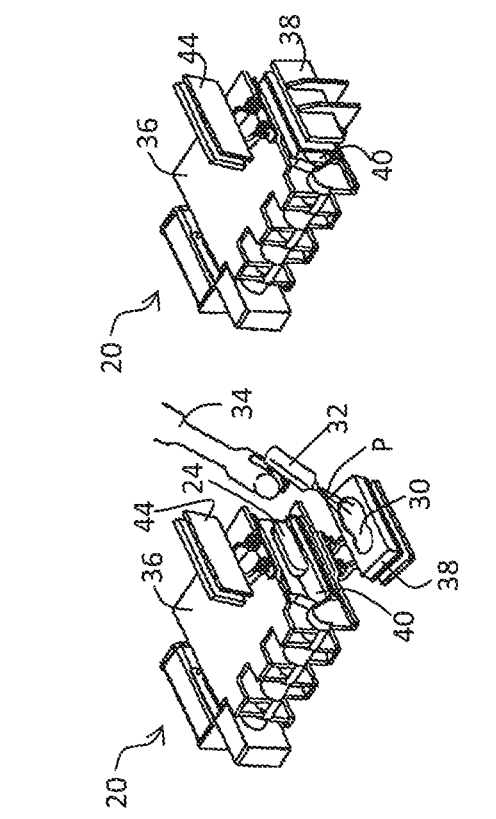
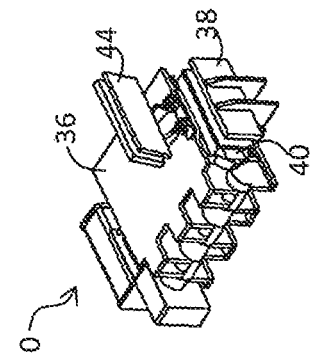
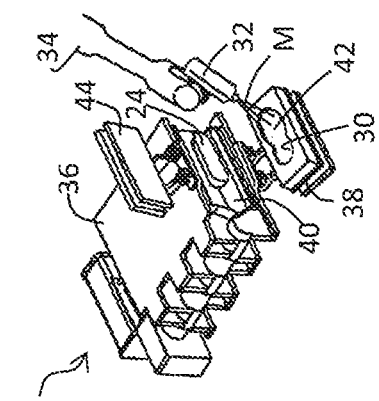
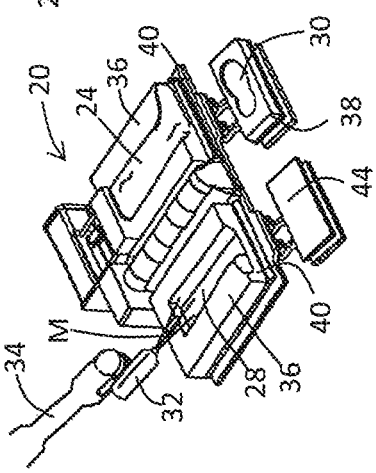

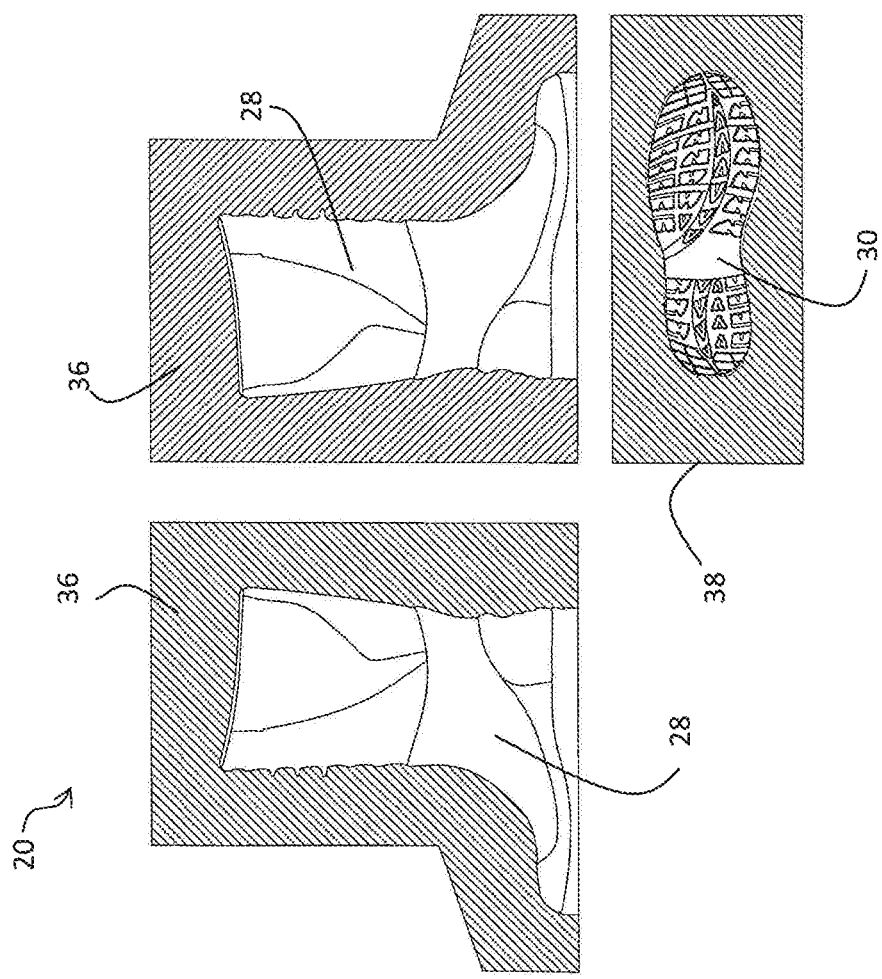

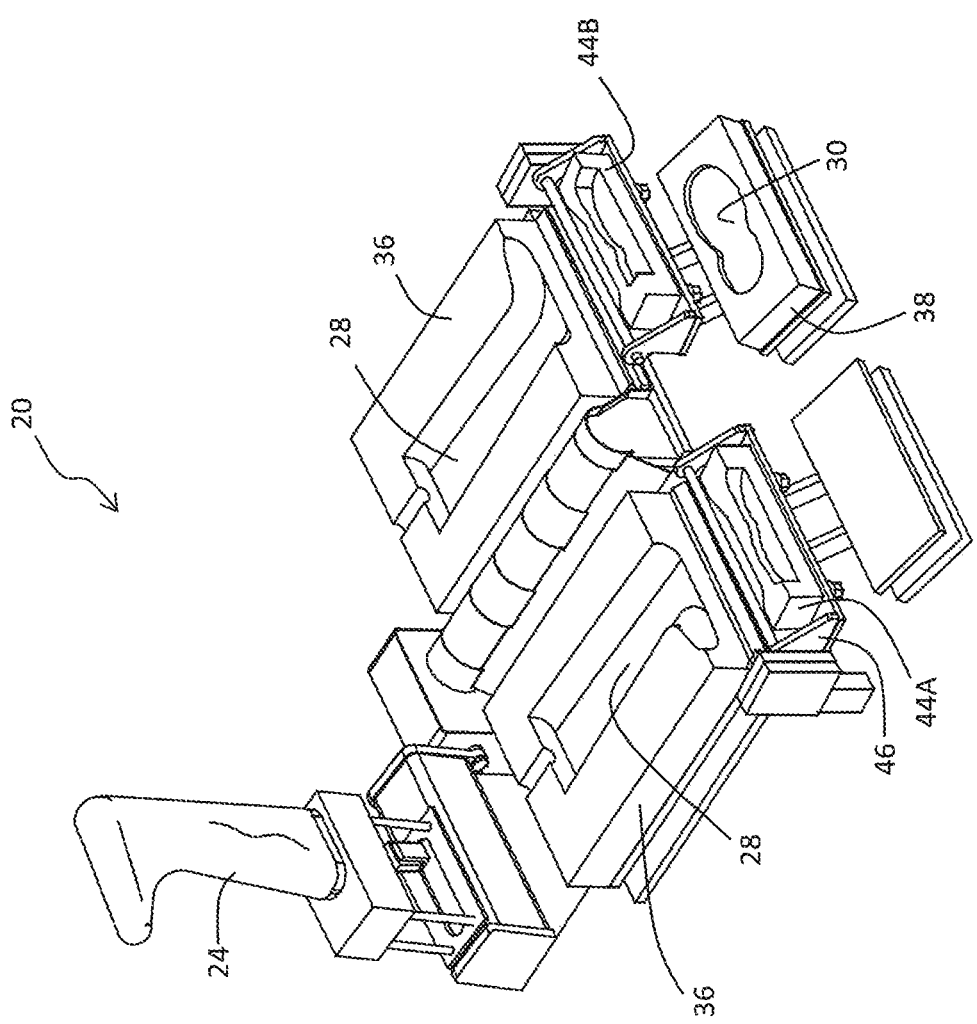

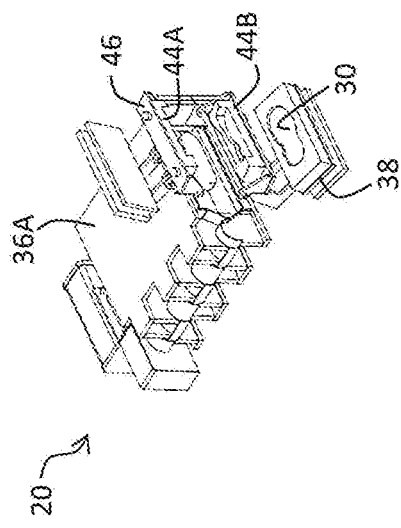
Fig. 17E
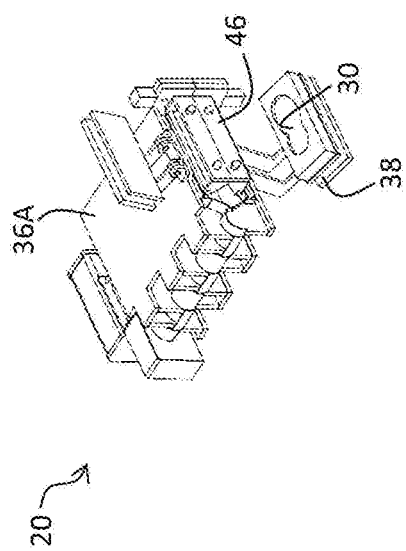
Fig. 17F
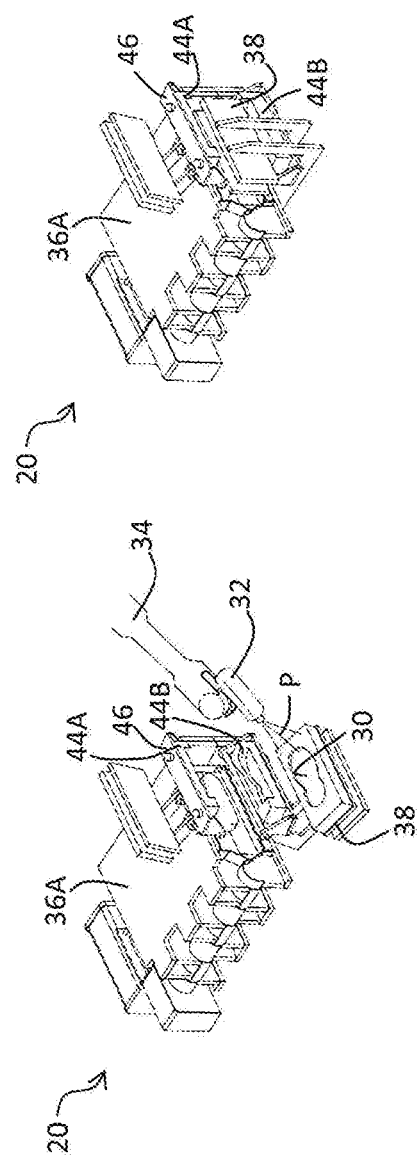
Fig. 17G
Fig. 17H

METHOD FOR THE PRODUCTION OF PLASTIC FOOTWEAR

RELATED APPLICATIONS

This application is a 35 U.S.C. 371 national stage filing from International Application No. PCT/IB2018/050954, filed Feb. 16, 2018, which claims priority to Italian Application No. 102017000017793, filed Feb. 17, 2017, the teachings of which are incorporated herein by reference.

The present invention relates to a method for the production of plastic footwear.

The terms "plastic footwear" or "full plastic footwear" are commonly used to indicate footwear in which the upper and the sole are both made by means of moulding processes using polymeric materials such as PVC, mono or multi-component polyurethane mixtures, thermoplastic polyurethane (TPU) mixtures, thermoplastic rubbers and resins, etc.

In this type of footwear the sole and upper are made as one piece, such as to form continuous elements which are not stitched or glued together. In this way advantageously the water-tightness of the footwear is ensured.

Examples of plastic footwear are shown in FIGS. 1 and 2.

FIG. 1, for example, shows in schematic form a shoe 10 with height up to the ankle, while FIG. 2 shows in schematic form a boot 100 with height up to the knee. In a known manner, slippers and sandals may be made so as to be "full plastic".

Plastic footwear is generally produced by injecting-moulding polymeric material inside a closed mould.

With reference to FIG. 3, which is provided in order to illustrate more clearly the technical problem considered and solved by the present invention, the polymeric material is injected inside a mould 1 formed usually by two side shells 2 and by at least a base 3 inside which an aluminium last 5 is enclosed. The material is injected by means of injection channels 4 which usually are located at the toe or the heel of the footwear. Alternatively, the material may be injected via an injection channel located at the top end of the footwear. Schematic illustrations showing the positioning of these injection channels are provided in FIG. 3 by way of example.

The polymeric material injected is intended to occupy the cavity or interspace 6 which, when the mould is closed, is formed between the inner walls of the shells 2, the inner wall of the base 3 and the outer surface of the last 5. This cavity 6 has a form and dimensions the same as those of the final footwear.

Once the material has cooled, the mould is opened and the footwear thus obtained is removed from the last.

Among the various types of plastic footwear available, plastic footwear made using expanded materials/foams (i.e. with a density less than 1 kg/l) obtained from mono or multi-component polyurethane mixtures is particularly popular since such footwear is very light and ensures excellent thermal insulation.

However, the known methods for the production of plastic footwear from both mono-component and multi-component polyurethane mixtures present various problems.

In particular the production of boots is problematic.

With the known production methods, in fact, it is not possible to obtain boots with walls having a small thickness, for example in the region of 1 to 2 mm, uniform along the entire surface.

With the known methods, in fact, in order to achieve correct filling of the mould, the cavities are made with thicknesses which gradually diminish in the direction away from the injection hole, i.e. from the point where the injection channel emerges inside the mould cavity.

For example, in the case where the injection channel 4 is positioned close to the toe of the footwear, the thicknesses of the cavity will be greater in the vicinity of the sole and the toe and smaller in the top part of the footwear. By way of example, at the toe of the footwear, the mould cavity may have a thickness in the region of 7 mm, while in the top part of the footwear the mould cavity may have a thickness in the region of 2 mm.

Obviously the thicknesses of the final footwear depend on the thicknesses of the mould cavity. Greater thicknesses on the one hand involve a greater cost and weight of the footwear and, on the other hand, restrict the field of application thereof. In fact, the aforementioned thicknesses restrict the use of polyurethane footwear to only the accident prevention and outdoor sectors, excluding the use of such footwear in the fashion sector.

Moreover, in order to provide plastic footwear with greater strength and comfort characteristics, it is known to use inner linings. These linings, in the form of a stocking, are generally fitted onto the last of the mould. The material injected into the mould cavity, flowing inside it, comes into contact and adheres to the stocking, which becomes the inner lining of the footwear.

However, the preparation of these stockings further complicates correct filling of the mould cavity in the case of moulding with polyurethane mixtures, in particular in the case where the footwear to be produced is a boot. The stocking, in fact, hinders flowing of the polyurethane mixture inside the cavity during injection.

In the known techniques of moulding plastic footwear using polyurethane mixtures, in order to avoid hindering the flow and expansion of the material inside the mould cavity, stockings made of non-woven fabrics/fabrics combined with polyurethane films which are usually smooth and often breathable are used. FIG. 4 shows a detail of plastic footwear in which the polyurethane material 9 injected inside the mould adheres to the polymer film 8 with which the lining 7 is combined.

These polymer films have the function of reducing the resistance of the stocking to flowing of the injected material and at the same time favour the adhesion between the injected material and stocking, without the latter being impregnated with the injected material. In fact, if the stocking were to become impregnated with the injected material, flowing of the polyurethane mixture inside the mould cavity could be further hindered.

These linings are, however, significantly more costly than those used, for example, for the moulding of PVC boots where usually stockings/linings which become impregnated with the injected material are used.

Moreover, problems arise in particular when producing boots made with polyurethane mixtures where the injected mixture is directly fixed, during the moulding process, to a lining of considerable non-uniform thickness, as for example in the case of a natural or synthetic furry lining or a padding made of synthetic material or felt.

These types of linings have irregular thicknesses. For example, a furry lining with a thickness of 6 to 7 mm may have a dimensional tolerance of up to 2-3 mm. It is clear therefore that, in order to allow the material to flow and expand at all the points inside the mould cavity, the mould cavity must be designed with thicknesses which are greater and which in any case may not be smaller than a minimum of 3-4 mm.

Usually such padding or furry linings are therefore applied after moulding of the footwear by means of gluing or stitching. This further processing step, however, involves an increase in the cost of the footwear and must be carried out by specialised labour.

Furthermore, the moulds for making plastic footwear are costly. Although the PVC and the polyurethane mixtures used for the production of plastic footwear are subject to substantially the same amount of shrinkage during moulding, it is not possible to use the same mould to produce footwear made of PVC or polyurethane as needed. The mould intended for moulding using polyurethane mixtures, in fact, must be designed with thicknesses which are greater than in the case of moulding with PVC, since otherwise correct filling of the mould cavity not be possible.

Moreover, in the case of moulding with polyurethane mixtures, it is not possible to provide plastic footwear, the external surface of which has defined textures and sharp edges, such as the details 11 shown in FIG. 5.

The injected polyurethane mixture must, in fact, be able to flow and expand inside the mould cavity and the presence of details with sharp edges results in the formation of defects, owing to the air bubbles which remain trapped within these edges.

Finally, it is difficult in the case of moulding with polyurethane mixtures of expanded foams to keep the density of the injected material constant and maintain a uniform shade of colour over the entire outer surface of the boot produced. Polyurethane mixtures of the expanded type are widely used in the production of plastic boots owing to the lightness which they give the product. The polyurethane mixture is injected inside the mould cavity via one or more injection channels and flows inside the mould cavity so as to expand and fill, with difficulty, the whole space which is available. From the above it can be understood that some zones of the mould cavity are reached by the mixture when it is still in a liquid phase, while other zones, i.e. those which are further from the injection channel, are filled owing to the expansion of the material, which in a known manner occurs during foaming of the polyurethane.

The two types of filling operations performed and the associated foaming steps produce, in the end product, zones with different densities of material.

Moreover, during flowing and expansion inside the mould cavity it is possible that the colouring additives added to the polyurethane mixture may be distributed in a non-uniform manner inside the cavity, resulting in streaks on the external surface of the boot or in any case an irregular shade of colour.

Finally, in the case of injection-moulding, the presence of the injection channel results in the formation of an injection plug, which is subsequently discarded. It is clear how this results in the wastage of material. Moreover, in the finished product the injection point of the material will be visible, with obvious consequence as regards appearance.

Some of the problems described above do not arise in the case where the injected polyurethane mixture is of the compact type, i.e. has a density equal to or greater than 1 kg/l. In this case, in fact, the injected material could also flow inside a mould cavity with small thicknesses.

However, the use of compact polyurethane mixtures results in the formation of heavier footwear, in particular in the case where the footwear is a boot and at the same time requires the use of injection machines able to ensure greater injection pressures and suitable mould closing forces.

Finally, some of the problems mentioned above, relating to injection-moulding using polyurethane mixtures, also arise in the case where moulding is performed by means of casting and in an open mould.

In this case also, in fact, even if casting of the polyurethane mixture inside the mould cavity is performed in an open mould, the following foaming step, during which the mixture is distributed inside the whole free volume of the cavity, then expanding and solidifying, necessarily occurs when the mould is closed and therefore is affected by the same problems described with reference to the injection-moulding method.

The object of the present invention is therefore to solve the drawbacks of the prior art.

A first task of the present invention is to provide a method for the production of plastic footwear, by means of moulding using a polyurethane mixture, which allows plastic footwear with a small thickness and low weight to be obtained.

A second task of the present invention is to provide a method for the production of plastic footwear, by means of moulding using a polyurethane mixture, which allows the application, to the footwear, directly during moulding, of a possible lining which can be impregnated and/or is thick.

A further task of the present invention is to provide a method for the production of plastic footwear, by means of moulding using a polyurethane mixture, which allows the manufacture of footwear with an external surface provided with textures or details having sharp edges.

Furthermore, a task of the present invention is to provide a method for the production of plastic footwear, by means of moulding with a polyurethane mixture, whereby footwear with a constant material density and uniform and homogeneous colour along the entire external surface may be obtained.

A further task of the present invention is to provide a method for the production of plastic footwear, by means of moulding with a polyurethane mixture, which can be easily applied on an industrial level.

Moreover, a task of the present invention is to provide a method for the production of plastic footwear, by means of moulding with a polyurethane mixture, which allows the use of moulds designed to be used also with different polymeric materials, for example PVC.

Finally, a task of the present invention is to provide a method for the production of plastic footwear, by means of moulding using a polyurethane mixture, which does not have an injection channel and therefore does not result in the wastage of material and the presence of any visible injection points on the footwear.

The object and the main tasks described above are achieved with a method for the production of plastic footwear according to claim 1.

The characteristic features and the further advantages of the invention will emerge from the description, provided hereinbelow, of a number of examples of embodiment, provided by way of a non-limiting illustration, with reference to the accompanying drawings in which:

FIGS. 1 and 2 show in schematic form side views of plastic footwear which can be obtained with the method according to the present invention;

FIGS. 6A, 6B, 6C, 6D and 6E show in schematic form some steps of a first embodiment of the method according to the invention;

FIGS. 7A, 7B, 7C, 7D and 7E show in schematic form some steps of a second embodiment of the method according to the invention;

FIGS. 8A, 8B, 8C, 8D, 8E, 8F and 8G show in schematic form some steps of a third embodiment of the method according to the invention;

FIGS. 9A, 9B, 9C, 9D, 9E, 9F, 9G and 9H show in schematic form some steps of a fourth embodiment of the method according to the invention;

FIGS. 10A, 10B, 10C, 10D, 10E, 10F and 10G show in schematic form some steps of a further embodiment of the method according to the invention;

FIG. 13 shows a schematic view of a mould, in the open configuration, suitable for being used with the method according to the invention;

FIG. 16 shows a schematic view of a further embodiment of a mould, in the open configuration and mounted on a corresponding mould holder, suitable for being used with the method according to the invention;

FIGS. 17A, 17B, 17C, 17D, 17E, 17F, 17G and 17H show in schematic form some steps of the method according to the invention in which the mould shown in FIG. 16 is used.

Figure 3:
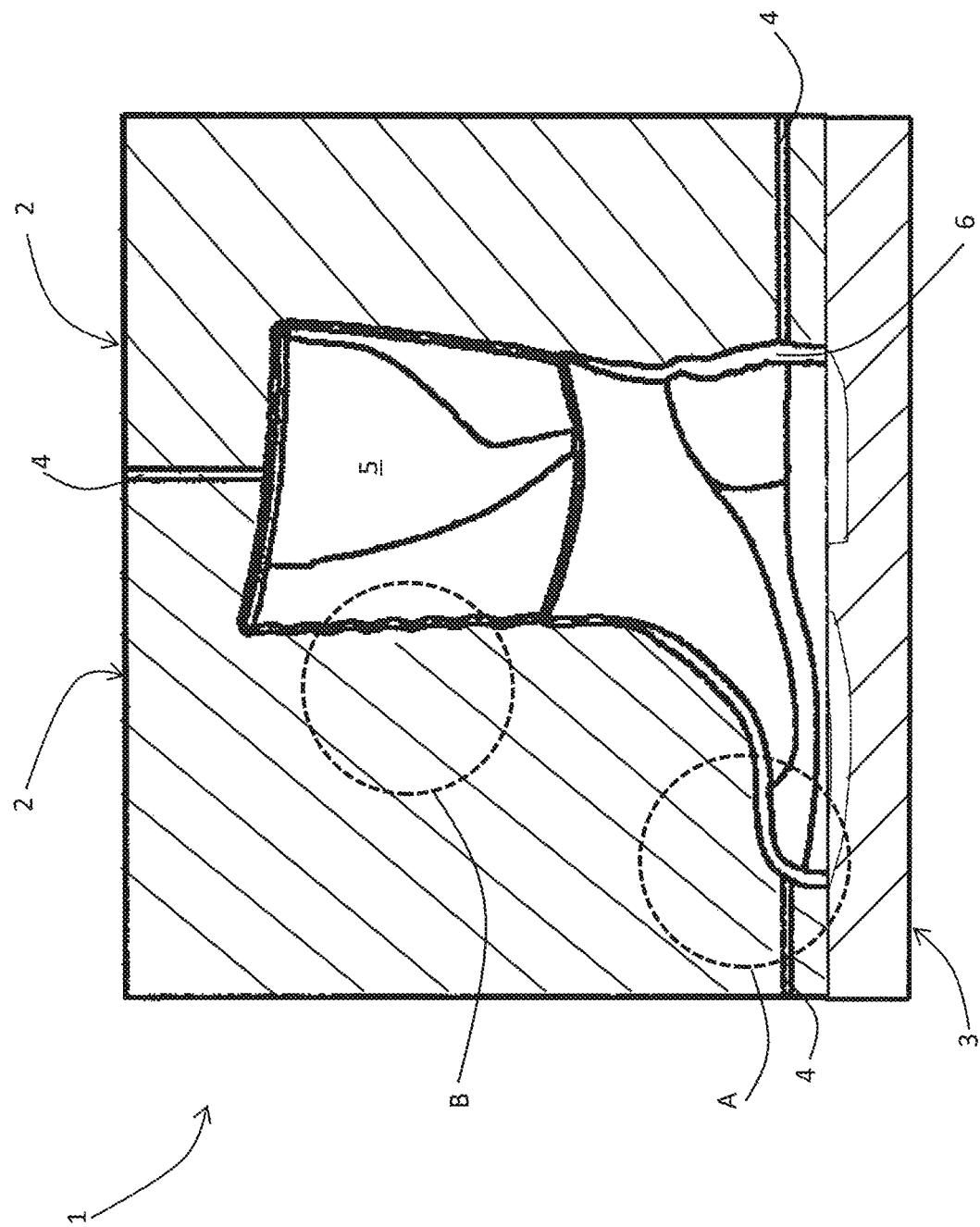
FIG. 3 shows in schematic form a cross-sectional view of a mould which can be used for making plastic footwear by means of a known injection method.
Figure 5:
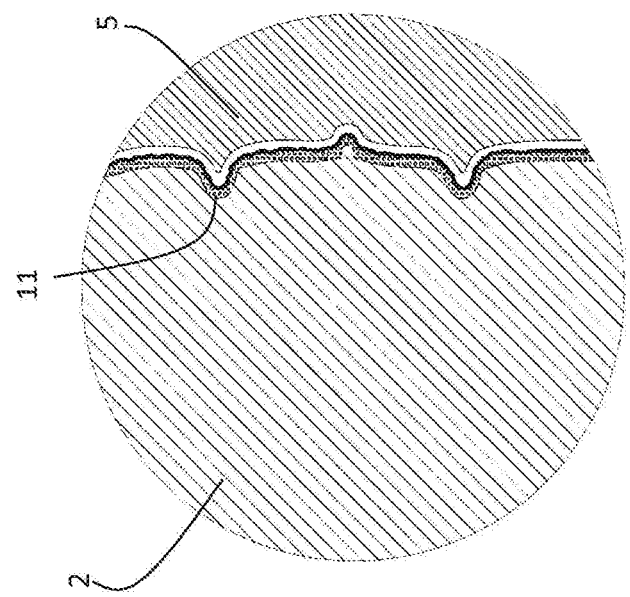
FIG. 5 shows a view, on a larger scale, of a detail of FIG. 3 indicated by B.

With reference to the attached figures, a method according to the invention for the production, by means of moulding, of plastic footwear 10, 100 of the "full plastic" type using a mixture of polyurethane M, P is described.

As already mentioned, "full plastic" footwear is to be understood as meaning footwear in which the upper and the sole are made integrally such as to form continuous elements which are not stitched or glued together. In other words, in this type of footwear, the sole and the upper are made as one piece.

FIGS. 1 and 2 show, as examples of footwear which can be obtained using the method according to the invention, a shoe 10, formed by a sole 11 and by an upper 12, intended to enclose the foot as far as the ankle, and a boot 100, formed by a sole 101 and by an upper 102, intended to enclose the foot and the bottom part of the leg as far as the knee.

However, as will become clear from the description below, the innovative principles of the present invention may also be advantageously applied to different types of plastic footwear, such as sandals and slippers.

Figure 15:
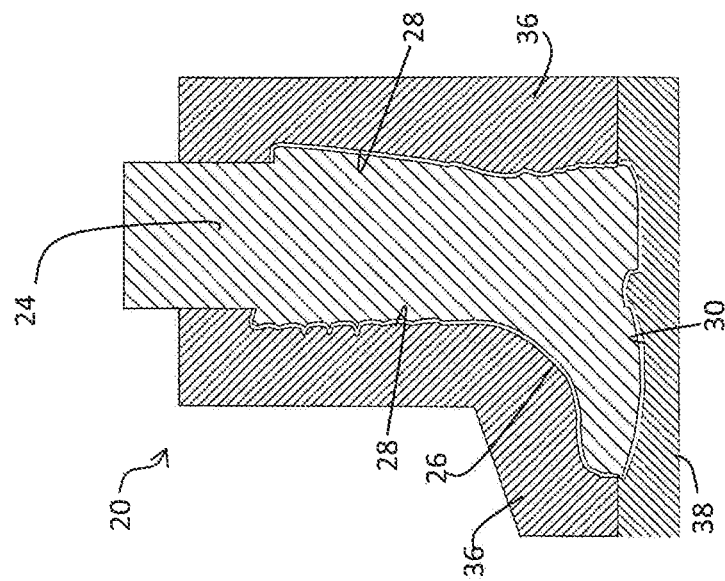
FIG. 15 shows a schematic view, similar to that of FIG. 14, showing the positioning of a shoe last inside the mould.
Figure 14:
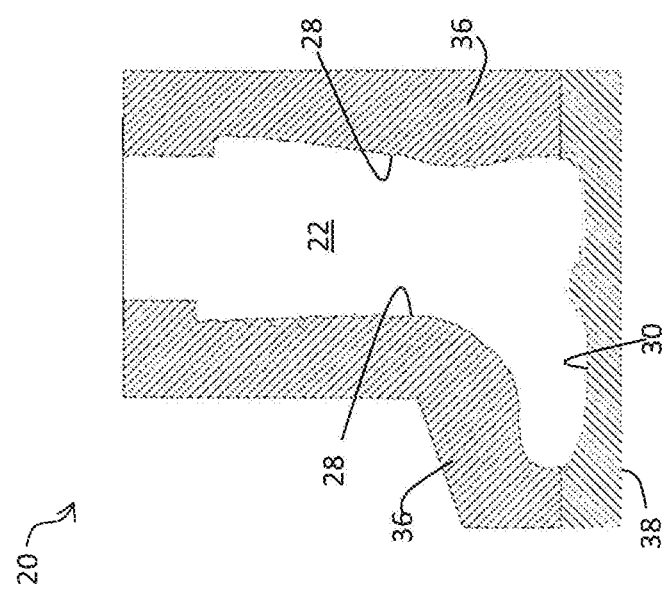
FIG. 14 shows a schematic longitudinally sectioned view of a mould, in the closed configuration, suitable for being used with the method according to the invention.

The method according to the invention comprises in particular the following steps:

providing a mould 20 having a mould cavity 22 defined by at least two impressions 28, 30 and designed to receive a shoe last 24 so as to define, when the mould 20 is closed, an interspace 26 having the shape and dimensions of the plastic footwear 10, 100 to be produced (see FIGS. 13, 14 and 15).

spraying a polyurethane mixture M, P onto said at least two impressions 28, 30 of the mould cavity 22;

inserting the shoe last 24 inside said mould cavity 22;

closing the mould cavity 22 so that the sprayed polyurethane M, P occupies said interspace 26;

opening the mould 20, once at least the demoulding time td for the sprayed polyurethane mixture M, P has lapsed, such that the sprayed polyurethane mixture M, P has solidified inside the interspace 26 forming said plastic footwear 10, 100;

extracting the shoe last 24 from the mould cavity 22;

removing the plastic footwear 10, 100 from the shoe last 24.

In a known manner, once the footwear 10, 100 has been removed from the shoe last 24, any moulding burrs will be trimmed.

The last 24 is preferably made of aluminium and, in a known manner, has a shape and dimensions which are the same as the overall form of the foot and the leg. It defines the shape and the internal volume of the footwear 10, 100.

The impressions 28, 30 of the mould cavity 22 define the shape and external dimensions of the footwear.

The volume contained within the impressions 28, 30 and the outer surface of the last 24 forms the interspace 26 which must be filled by the polyurethane mixture in order to obtain the footwear 10, 100.

In the context of the present description, spraying means propelling nebulized (atomized) liquid mixtures. Basically, the microparticles of the polyurethane mixture M, P are conveyed inside an air stream.

For the purposes of the present invention, "demoulding time" td means the minimum time interval which must lapse, once the polyurethane mixture M, P has been sprayed, in order to extract the footwear 10, 100 from the mould 20, without the footwear undergoing any deformation.

Advantageously, the polyurethane mixture M, P sprayed onto the impressions 28, 30 of the mould cavity 22 may be a mono or multi-component mixture.

Moreover, the sprayed polyurethane mixture M, P may be polyester based or polyether based. Preferably, the sprayed polyurethane mixture M, P is a mixture of the expanded type, i.e. with a density less than 1 kg/l.

The polyurethane mixture is sprayed using a spraying device 32 (see for example FIGS. 6A-6E). Advantageously, the spraying device 32 may be moved by means of an anthropomorphic robot arm 34 programmed to spray the quantity of polyurethane mixture needed to cover correctly each impression 28, 30 of the mould cavity 22 depending on the shape and the dimensions of the footwear 10, 100 to be obtained.

Alternatively, the spraying device 32 may be moved manually.

Advantageously, the spraying step of the method according to the invention is performed with the mould open and therefore allows the various impressions of the mould cavity to be correctly and uniformly covered.

Preferably, the spraying step is performed with the mould kept in the horizontal position.

Spraying of the polyurethane mixture on the impressions 28, 30 is performed such that the polyurethane mixture is distributed so as to occupy the whole interspace 26, optionally also expanding once the mould is closed. The polyurethane mixture therefore does not have to flow inside the interspace, as instead occurs in injection moulding.

It is therefore no longer necessary to increase the thicknesses of this interspace, as occurs in the case where an injection-moulding process is used, in particular in the case where expanded polyurethane mixtures are used.

Figure 4:
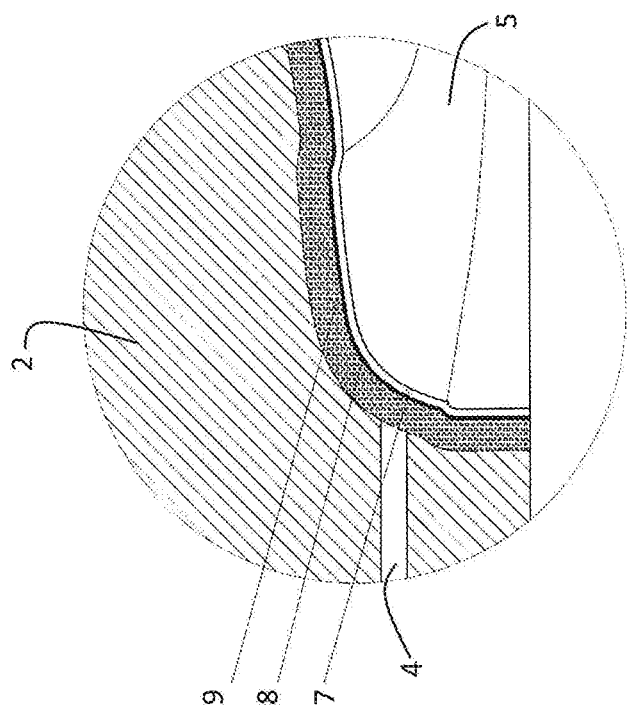
FIG. 4 shows a view, on a larger scale, of the detail of FIG. 3 indicated by A.
Figure 11:
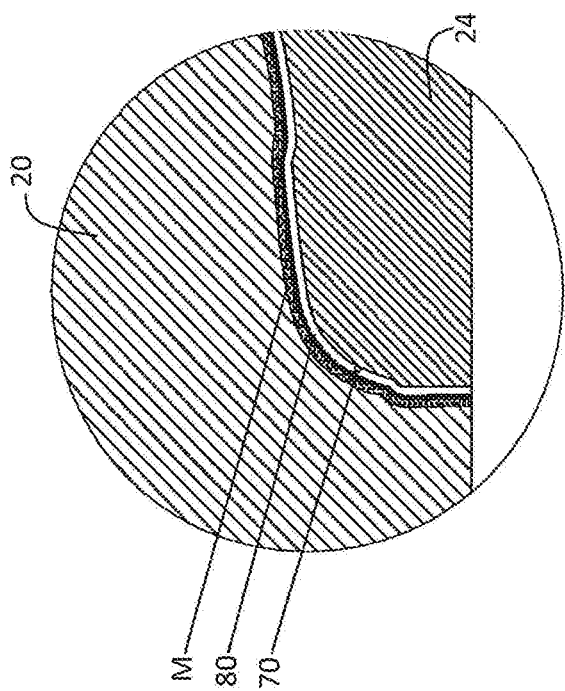
FIG. 11 shows a view similar to that of FIG. 4, in which a detail of plastic footwear which can be obtained with the method according to the invention is shown.

With reference to the example shown in FIG. 11, if compared with FIG. 4, it can be noted how, with the method according to the present invention, it is possible to obtain plastic footwear with smaller thicknesses compared to the known footwear. For example, it is possible to obtain plastic footwear with uniform thickness in the region of 1-2 mm.

These smaller thicknesses may also be obtained in the case where a lining 70 is fitted onto the shoe last 24. The lining 70 preferably is in the form of a stocking.

The lining 70, advantageously, is fitted onto the shoe last 24, before the step of spraying the polyurethane mixture M, P is performed and, obviously, before the mould cavity 22 is closed. Optionally, the polyurethane mixture M, P may also be sprayed onto the lining 70, before the mould cavity 22 is closed.

Differently from that which occurs during the known injection-moulding processes, the presence of the lining 70 does not hinder the correct filling of the interspace 26, since the polyurethane mixture, before the mould cavity is closed, is already uniformly distributed on the impressions 28, 30 of the mould cavity.

The lining 70 may in any case be provided with a surface film 80 in the case where it is necessary that the lining should not be impregnated by the sprayed polyurethane mixture. Moreover, advantageously, by performing spraying of the polyurethane mixture M, P it is possible to obtain plastic footwear provided with natural or synthetic furry linings 70A or with a padding of synthetic material or felt, and therefore with irregular thicknesses.

Figure 12:
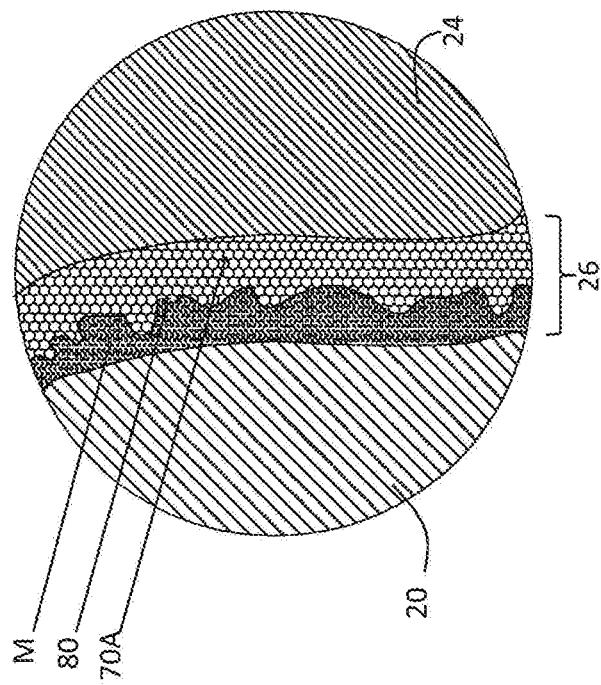
FIG. 12 shows a cross-sectional view of a further detail of plastic footwear which can be obtained with the method according to the invention.

As can be clearly seen in FIG. 12, the presence of these linings does not adversely affect the correct filling of the interspace 26 since the sprayed mixture, when the mould 10 is closed, may be compressed and adhere to the lining. The lining may adhere to the polyurethane mixture (in the case of linings combined with breathable or non-breathable polyurethane films) or be impregnated with it, to a greater or lesser degree, depending on the thickness at a given point, but the footwear will have a defect-free external surface.

Advantageously in this case also, the lining 70A may be combined with a polyurethane film 80 which prevents the lining from being soaked with the sprayed polyurethane mixture.

Preferably, the polyurethane mixture M, P will be sprayed using a spraying device 32 which has a small amount of play between the mixing screw and the internal walls of the mixing chamber, where the base components of the polyurethane mixture M, P (polyol and isocyanate and optional additives) are mixed together. This play is preferably constant and has a value of less than 1 millimetre.

Advantageously, the polyurethane mixture M, P may be sprayed onto the impressions 28, 30 of the mould cavity 22 keeping the value of the throughput preferably between 0.5 and 25 grams per second.

Moreover, the mixing screw of the spraying device 32 preferably is made to rotate at a speed of rotation of between 8000 and 30000 rpm.

A spraying device with these technical characteristics is described in European Patent 2346614.

By means of this type of spraying device it is possible to spray the polyurethane mixture M, P with an excellent degree of precision so that it covers perfectly the finishes of the impressions 28, 30, also when defined textures and sharp edges are present.

Moreover, advantageously with the polyurethane mixture spraying process it is possible to obtain footwear which is free of defects, such as air bubbles or pockets, which may be generally encountered during the known processes for moulding polyurethane mixtures by means of casting or injection.

Reference is now made to FIGS. 6A-6E which show a first embodiment of the method according to the invention.

In this embodiment, the mould cavity 22 is formed by at least two side shells 36, which are divided along a longitudinal plane, and by a base 38.

The step of closing the mould 20 is performed by moving the side shells 36 together so that they receive inside them the shoe last 24 and make contact along a longitudinal closing edge (see FIG. 6D). Then (see FIG. 6E), the base 38 is brought into contact against a bottom surface 40 of the side shells 36, so as to obtain the interspace 26 which must be filled with the sprayed polyurethane mixture.

The movements and the mechanisms for moving the side shells of the mould and the base will not be described in detail since they are well known to the person skilled in the art.

As shown in schematic form in the figures, each side shell 36 comprises an impression 28 and the base 38 comprises in turn an impression 30.

The impressions 28 are preferably intended to form the upper portion (leg piece) 12, 102 of the footwear, while the impression 30 is preferably intended to form the sole portion 11, 101 of the footwear 10, 100. In particular, the impression 30 is intended to form the tread portion of the footwear 10, 100.

During spraying the polyurethane mixture is preferably sprayed onto the impressions 28 of each side shell 36 (see FIGS. 6B and 6C) and onto the impression 30 of the base 38 (see FIG. 6D) so as to cover them.

Preferably, the polyurethane mixture is sprayed uniformly onto the impressions of the mould cavity so as to cover them completely.

Obviously in the case where the footwear envisages variations in thickness, for example in the heel zone, at these points it will be possible to spray a greater or smaller amount of polyurethane mixture.

Preferably, as shown in FIGS. 6B-6D, the polyurethane mixture M may be sprayed firstly onto the impressions 28 of the two side shells 36 and then onto the impression 30 of the base 38.

Advantageously, after spraying the impression 28 of one of the side shells with the polyurethane mixture M (see FIG. 6B), the shoe last 24 is moved towards this impression 28, while in the meantime the polyurethane mixture M is also sprayed onto the impression 28 of the second side shell (see FIG. 6C).

The base 38 may be brought into contact against the bottom surface 40 of the two side shells 36, after the corresponding impression 30 has been sprayed with the polyurethane mixture M (see FIGS. 6D and 6E).

According to an alternative embodiment, not shown in FIGS. 6A-6E, the polyurethane mixture is sprayed firstly onto the impression 30 of the base 38 and then onto the impressions 28 of the two side shells 36.

The sequence of the spraying steps and the sequence of the mould closing steps may, in fact, vary depending on the type of mould 20 and the polyurethane mixture used.

FIGS. 7A-7E show a variant of the above embodiment.

In this embodiment, before the mould cavity 22 is closed, a polymeric material insert 42 is introduced inside the mould cavity 22. Preferably the insert 42 is introduced inside the impression 30 of the base 38.

The insert 42 may be made for example of rubber or thermoplastic polyurethane. Advantageously, the insert 42 may be shaped so as to form the tread of the footwear produced.

Advantageously, before closing the mould cavity 22, the polyurethane mixture M may be sprayed partly also onto the insert 42 (see FIG. 7D) so as to favour its adhesion to the remaining portion of the footwear.

With reference to FIGS. 8A-8G, according to a different embodiment of the invention the mould 20 also comprises a cover 44. This cover 44 is designed to define, in combination with the two side shells 36 and the shoe last 24, a first intermediate interspace.

Advantageously, the cover 44 is arranged in such a way that the spraying step may be performed using two different polyurethane mixtures. For example, a first polyurethane mixture M may be used to form the upper portion 12, 102 of the footwear 10, 100, while a second polyurethane mixture P may be used to form the sole portion 11, 101 of the footwear 10, 100. For example, the second polyurethane mixture P may be a polyurethane mixture having a greater density than the first polyurethane mixture M, thus making it possible to obtain a sole 11, 101 which has a greater abrasion resistance than the other portions of the footwear, without negatively affecting the weight of the whole footwear.

For example, the second polyurethane mixture P may have a density equal to or greater than 1 kg/l and the first polyurethane mixture M may have a density less the 1 kg/l, preferably less than 0.6 kg/l, even more preferably less 0.4 kg/l.

With reference to FIGS. 8B and 8C, the first polyurethane mixture M may be advantageously sprayed onto the impressions 28 of the two side shells 36. After this spraying operation, the two side shells may be moved together so as to receive inside them the shoe last 24 (see FIG. 8D). Then the cover 44 is arranged against the bottom surface 40 of the two side shells 36 so as to obtain the first intermediate interspace (see FIG. 8E).

The second polyurethane mixture P may be sprayed onto the impression 30 of the base 38 (see FIG. 8F) and then, after removing the cover 44 from the two side shells 36, the base 38 is arranged against the bottom surface 40 of the two side shells 36 (see FIG. 8G).

FIGS. 9A-9H show a variant of the above embodiment.

In particular, in this variant a polymeric material insert 42 may be introduced inside the mould cavity 22 so that the second polyurethane mixture P is sprayed, at least partly, on top of this insert.

Preferably, this insert 42 is introduced inside the impression 30 of the base 38 (see FIG. 9F) and the second polyurethane mixture P is sprayed, at least partly, onto it (see FIG. 9G), before arranging the base 38 against the bottom surface 40 of the side shells 36.

Reference is now made to FIGS. 10A-10G. In this embodiment, the two side shells 36 are moved together so as to receive the last 24 and rest against a longitudinal closing edge, before the first polyurethane mixture M is sprayed along the respective impressions 28.

A second polyurethane mixture P, in fact, is first sprayed onto the impression 30 of the base 38 (see FIG. 10A). Then the base 38 is placed against the bottom surface 40 of the two side shells 36 (see FIG. 10B) so as to allow the polymerization reaction of the mixture P to take place. In this way it is possible to form the sole portion of the footwear before forming the upper portion. Moreover, it is possible to use two different polyurethane mixtures to form, respectively, the sole portion and the upper portion of the footwear. For example, a polyurethane mixture P with a density greater than the polyurethane mixture M may be used to form the sole portion, while the polyurethane mixture M with a lower density may be used to form the upper portion.

Thereafter, the base 30 is moved away from the bottom surface 40 of the side shells 36 and the two side shells are separated from each other (see FIG. 10C).

The first polyurethane mixture M is then sprayed onto the respective impressions 28 in the manner described above (see FIGS. 10D and 10E).

Once the two side shells have been closed around the last 24, the base 38 is again positioned against the bottom surface 40 of the two side shells 36 (see FIG. 10G) so as to close the mould cavity and allow the polymerization reaction of the polyurethane mixture M to take place.

The polyurethane mixture M may also be sprayed onto the impression 30 of the base 38 before placing the base 38 against the bottom surface 40 of the two side shells 36, so as to favour adhesion between the sole portion 11, 101 of the footwear and the upper portion 12, 102 thereof (see FIG. 10F).

In this way it is possible to form the sole portion of the footwear, before forming the upper portion. Moreover, it is possible to use two different polyurethane mixtures to form, respectively, the sole portion and the leg portion of the footwear. For example, a higher density polyurethane mixture P with a greater abrasion resistance may be used to form the sole portion, while a polyurethane mixture M with a lower density may be used to form the upper portion.

Reference is now made to FIG. 16 and FIGS. 17A-17H.

FIG. 16 shows a further embodiment of a mould 20 suitable for use with the method according to the invention.

In particular, in this embodiment, the cover designed to define, in combination with the two side shells 36 and the shoe last 24, a first intermediate interspace, is formed by two separate elements, i.e. a first element 44A and a second element 44B, each fixed to one of the two side shells 36.

With reference to FIG. 16, the first element 44A and the second element 44B are movable with respect to the side shell 36 to which they are fixed via movement means 46. These movement means 46 preferably comprise pivoting supports designed to rotate about an axis perpendicular to the longitudinal axis of the shells 36.

Obviously, different embodiments of the movement means 46 are possible in order to satisfy specific requirements as regards the relative movement of the shells 36 and first and second elements 44A, 44B.

In detail, the first element 44A and the second element 44B are intended to come into contact against the bottom surface of the side shells 36 and be moved together when the two side shells 36 are closed around the last 24.

In this way, the two elements 44A, 44B define the first intermediate interspace such as to avoid, during the spraying steps, any leakages of polymeric material along the bottom surface of the side shells 36.

FIGS. 17A-17H show an embodiment of the method according to the invention in which the mould shown in FIG. 16 is used. The steps shown in FIGS. 17A-17H correspond substantially to the steps shown in FIGS. 8A-8G in which the use of a mould 20 provided with a single cover 44 is illustrated.

Figure 17A:
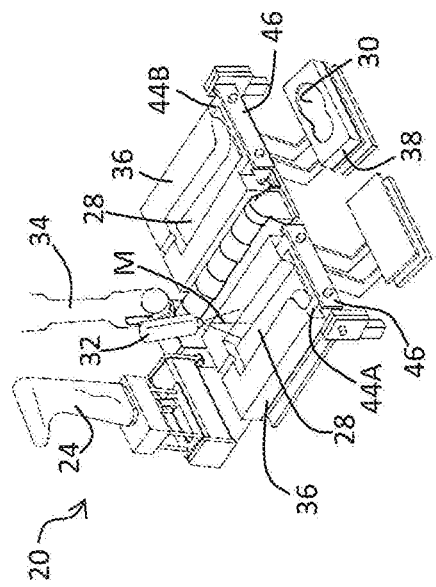

The difference consists in the fact that preferably the two elements 44A and 44B are arranged next to the respective side shells 36 before the polyurethane mixture M is sprayed onto the impressions 28 of each side shells 36 (see FIG. 17A).

Figure 17B:
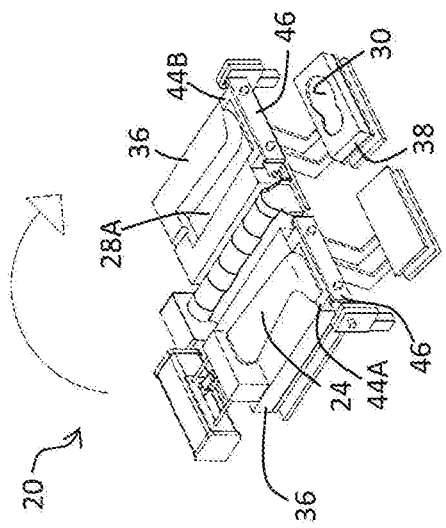
Figure 17C:
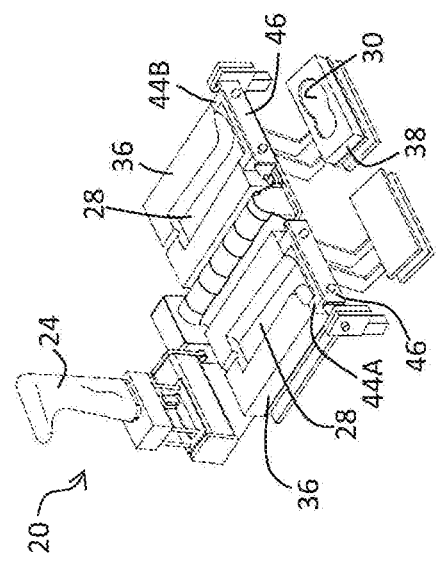
Figure 17D:
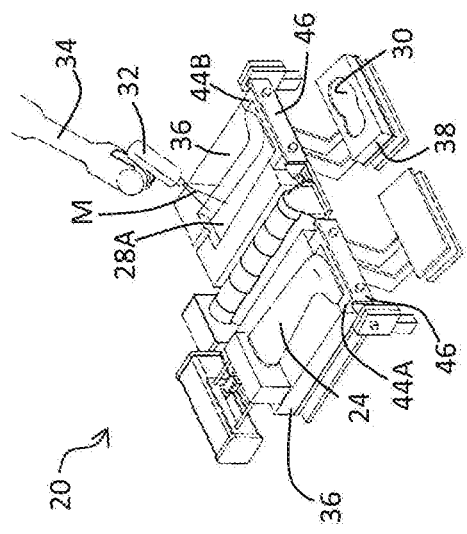

In this way it is ensured that there is no leakage of polymeric material from the shells 36 during the subsequent spraying of the polyurethane mixture M onto the impressions 28, when the two shells 36 are not yet closed around the last 24 (see FIGS. 17B and 17C).

The inner surfaces of the two elements 44A and 44B are shaped so as to be able to receive inside them the bottom portion of the last 24.

Once the polymerization reaction of the first polymer mixture M has taken place, the two elements 44A, 44B, by means of the pivoting movement means 46, may be separated from each other (see FIG. 17F) so as to create the space for the base 38.

After the second polymer mixture P has been sprayed onto the impression 30 of the base 38 (see FIG. 17G), the base is arranged against the bottom surface of the two shells 36 (see FIG. 17H). In this position the base 38 is positioned between the two elements 44A, 44B. Advantageously, the mould shown in FIG. 16 may be used also with the other modes of implementation of the method according to the present invention described above.

For example, a single polymer mixture M may be sprayed onto the impressions 28 of the two shells 36 and onto the impression 30 of the base 38.

Or the polymer mixture may be sprayed first onto the impression 30, and then spraying of the impressions 28 of the two shells 36 may be performed.

Advantageously, with the method according to the present invention it is possible to spray in series, during the same spraying step, polyurethane mixtures M; P having different densities and/or different mechanical properties.

For example, with reference to FIGS. 6A-6E, after spraying a first polyurethane mixture onto the impressions 28 of the two side shells 36 and before moving together the two side shells (see FIGS. 6B and 6C) a second polyurethane mixture may be sprayed onto the first polyurethane mixture which has just been sprayed, so as to cover it.

The two side shells will be moved together, once the second polyurethane mixture has also been sprayed.

Advantageously, the second polyurethane mixture will have a density less than that of the first polyurethane mixture sprayed.

In this way, with the first denser polyurethane mixture, the external surface of the footwear may be formed, while with the second less dense polyurethane mixture the internal part of the footwear will be formed. Advantageously, it is therefore possible to use specific denser polyurethane mixtures in order to form the visible part of the footwear, without adversely affecting the weight thereof.

Between the first and second spraying operations performed in series any inserts (for example glass fibres, carbon fibres, etc.) may be arranged between the two polyurethane mixtures so as to improve the mechanical properties of the footwear and optionally obtain footwear with a more attractive appearance.

Several spraying operations, performed in series, using polyurethane mixtures with different properties are also possible with the other modes of implementation of the method described above.

From the above it is clear how with the method according to the invention it is possible to solve the problems described above with reference to the prior art.

In particular, by means of a method according to the invention it will be possible, compared to the known moulding methods, to design moulds which have small thickness interspaces, without negatively affecting the quality of the finished product.

It will be possible, in fact, to obtain plastic footwear having walls with thin and uniform thicknesses over the entire surface. This enables the weight and cost of the footwear to be reduced.

In particular, with the method according to the invention, it will be possible to produce plastic footwear with small thickness walls, using polyurethane mixtures of the expanded type, i.e. with a density less than 1 kg/l.

Moreover, with the method according to the invention, it is possible to apply to the footwear, already during the moulding step, not only internal linings which are smooth and/or combined with polyurethane films, but also coating-free linings which may be impregnated with the sprayed material and which are less costly.

Furthermore, with the method according to the invention, it is possible to apply inside the footwear, already during the moulding step, also linings with large irregular thicknesses (in the region of 7-10 mm), such as synthetic material padding or natural or synthetic furry linings, without having to resort to subsequent manual application thereof, resulting in an obvious reduction of the time and costs involved.

Advantageously, the method according to the invention may be implemented also using moulds designed to be used in processes for the injection-moulding of different polymeric materials, for example moulds designed for PVC injection-moulding. In this way, without additional costs, a broader range of products may be obtained with a single mould.

Moreover, spraying of the polyurethane mixture advantageously also allows plastic footwear with defined textures and sharp edges to be produced, because there is no longer the risk that air bubbles may remain trapped inside the mould cavity.

Furthermore, spraying of the polyurethane mixture advantageously allows plastic footwear to be produced such that there are no visible injection points on the footwear, also avoiding wastage of material inside the injection channel.

Moreover, with the method according to the invention it is possible to produce footwear using polyurethane mixtures such as to obtain a uniform density of material over the whole volume of the footwear, since the polyurethane mixture is deposited uniformly over all the impressions of the mould cavity when the mould is open.

Finally, with the method according to the invention it is possible to obtain footwear with a uniform colour over the whole surface.

The person skilled in the art, in order to satisfy specific needs, may make modifications to the embodiments described above and/or replace the elements described with equivalent elements, without thereby departing from the scope of the attached claims.

For example, the steps of spraying the impressions of the side shells and the base and the sequence of the mould closing steps may be performed in a different order from that described, according to specific needs.

In the case of moulding using two different polyurethane mixtures, preferably the polyurethane mixture with a longer reaction time will be sprayed first.

The invention claimed is:

1. A method for the production of plastic footwear of the "full plastic" type by means of moulding using a polyurethane mixture, wherein a sole and an upper of the plastic footwear are made integrally as one piece, the method comprising the steps of:
providing a mould having a mould cavity defined by at least two impressions and designed to receive a shoe last so as to define, when the mould is closed, an interspace having the shape and dimensions of the plastic footwear to be produced;

spraying a polyurethane mixture with the mould open onto said at least two impressions of the mould cavity;

inserting the shoe last inside the said mould cavity;

closing the mould cavity so that the sprayed polyurethane mixture occupies said interspace;

opening the mould, once at least the demoulding time for the sprayed polyurethane mixture has lapsed, so that the sprayed polyurethane mixture has solidified inside the interspace forming said plastic footwear;

extracting the shoe last from the mould cavity;

removing the plastic footwear from the shoe last.

2. The method according to claim 1, characterized in that the mould cavity is formed by at least two side shells, which are divided along a longitudinal plane, and by a base and in that, in order to close the mould cavity, after inserting the shoe last inside it, the following steps are performed:

the side shells are moved together so that the said side shells surround the shoe last and make contact with each other along a longitudinal closing edge;

the base is arranged against a bottom surface of the side shells so as to obtain said interspace.

3. The method according to claim 2, characterized in that each side shell comprises an impression intended to form an upper portion of the plastic footwear and in that the base comprises an impression intended to form a sole portion of the plastic footwear;

during the spraying step the polyurethane mixture being sprayed onto the impressions of each side shell and onto the impression of the base so as to cover them uniformly.

4. The method according to claim 1, characterized in that the step of spraying the polyurethane mixture is performed using one or more anthropomorphic robot arms.

5. The method according to claim 1, characterized in that, before closing the mould cavity, a polymeric material insert is introduced inside the mould cavity;

the polyurethane mixture being partly sprayed also onto this insert.

6. The method according to claim 2, characterized in that the mould comprises a cover designed to define, in combination with the two side shells and the shoe last, a first intermediate interspace;

the spraying step comprising spraying a first polyurethane mixture onto the impressions of each side shell and spraying a second polyurethane mixture onto the impression of the base.

7. The method according to claim 6, characterized in that, after spraying the first polyurethane mixture, the two side shells are moved together so as to receive inside them the shoe last and make contact with each other along a longitudinal closing edge;

the cover being arranged against the bottom surface of the side shells so as to define said first intermediate interspace.

8. The method according to claim 7, characterized in that the second polyurethane mixture is sprayed onto the impression of the base and then, after removing the cover from the two side shells, the base is arranged against the bottom surface of the two side shells.

9. The method according to claim 8, characterized in that a polymeric material insert is introduced inside the impression of the base;

the second polyurethane mixture being sprayed, at least partially, onto this insert.

10. The method according to claim 2, characterized in that the two side shells are moved closer together so as to receive the shoe last and make contact with each other along a longitudinal closing edge, before the first polyurethane mixture is sprayed along the impressions of each side shell;

a second polyurethane mixture being then sprayed onto the impression of the base and the base being arranged against the bottom surface of the two side shells to form the sole portion of the plastic footwear before forming the upper portion.

11. The method according to claim 10, characterized in that, after removing the base from the bottom surface of the two side shells and after moving the two side shells away from each other, a first polyurethane mixture is sprayed onto the impressions of the two side shells;

the two side shells being then moved closer together so as to receive the shoe last and make contact with each other along a longitudinal closing edge, and the base being arranged against the bottom surface of the two side shells.

12. The method according to claim 1, characterized in that, before closing the mould cavity, a lining in the form of a stocking is fitted onto the shoe last.

13. The method according to claim 12, characterized in that said lining consists of a natural or synthetic furry lining or a padding made of synthetic material or felt.

14. The method according to claim 2, characterized in that the mould comprises a cover designed to define, in combination with the two side shells and the shoe last, a first intermediate interspace;

the cover comprising a first element and a second element, each fixed to one of the two side shells.

15. The method according to claim 14, characterized in that the first element and the second element are intended to come up against a bottom surface of the side shells and be moved close together, when the two side shells surround the shoe last and make contact with each other along a longitudinal closing edge.

16. The method according to claim 14, characterized in that the first element and the second element are movable with respect to the side shell to which they are fixed by means of movement means;

said movement means comprising pivoting supports designed to rotate about an axis perpendicular to a longitudinal axis of the side shells.

17. The method according to claim 1, characterized in that the polyurethane mixture is a mixture of the expanded type with a density less than 1 kg/l.

18. The method according to claim 6, characterized in that the second polyurethane mixture has a greater density than the first polyurethane mixture.

19. The method according to claim 2, characterized in that each side shell comprises an impression intended to form an upper portion of the plastic footwear and in that the base comprises an impression intended to form the tread portion of the plastic footwear.

20. The method according to claim 5, characterized in that said insert is shaped so as to form the tread of the plastic footwear.

\* \* \* \* \*